United States Patent

[11] 3,596,863

| | | |
|---|---|---|
| [72] | Inventor | Walter E. Kaspareck<br>Huntsville, Ala. |
| [21] | Appl. No. | 794,530 |
| [22] | Filed | Jan. 28, 1969 |
| [45] | Patented | Aug. 3, 1971 |
| [73] | Assignee | The United States of America as represented by the Administrator of the National Aeronautics and Space Administration |

[54] FINE ADJUSTMENT MOUNT
4 Claims, 3 Drawing Figs.

[52] U.S. Cl. .................................................. 248/278,
33/72, 248/183, 248/487, 350/285, 350/287
[51] Int. Cl. ...................................................... G02b 7/00
[50] Field of Search ............................................ 248/278,
279, 285, 286, 124, 125, 183, 184, 185, 487;
350/321, 285; 74/89.1; 33/72

[56] References Cited
UNITED STATES PATENTS

| 2,419,887 | 4/1947 | Disse ........................... | 248/179 X |
| 3,407,018 | 10/1968 | Miller .......................... | 74/89.15 X |
| 3,436,050 | 4/1969 | Tibbals ........................ | 248/487 |

*Primary Examiner*—Roy D. Frazier
*Assistant Examiner*—J. Franklin Foss
*Attorneys*—L. D. Wofford, Jr., C. C. Wells and G. T. McCoy ABSTRACT: A mount for optical devices which is formed with a horizontal slot or cutout, a longitudinal slot, and a vertical slot leaving only a small bridgelike portion between adjacent members which serves as a spring against an adjusting screw associated with each pair of members forming a slot. The most forward member adjacent the longitudinal slot has cantilevered arms to support the optical device.

Patented Aug. 3, 1971

3,596,863

INVENTOR
WALTER E. KASPARECK

BY
*Leon D. Wofford, Jr.*
ATTORNEYS

3,596,863

FINE ADJUSTMENT MOUNT

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

The present invention relates to a mount for an optical element and more specifically to a mount for fine adjustment of an optical element about three independent axes.

2. Description of the Prior Art

There are a variety of mounts used in the laboratory for supporting accessories such as lenses and prisms in optical work. One of the more successful mounts consists of two plates joined together by screws in a manner that could push and pull the two plates relative to each other and thereby angularly adjust the mounting plate. However, none of the prior mounts provided for a simple device which could be adjusted to a very fine degree along three independent axes arranged in three mutually perpendicular planes.

SUMMARY OF THE INVENTION

In the present invention an optical mount is provided having a single construction with a plurality of slots forming flexural pivots which enables screw means to adjust the optical element along three independent, perpendicularly related axes. The mount has a front portion joined by a side flexural pivot to a middle portion. The middle portion is joined by an upper edge flexural pivot to a back portion which is supported at its lower end by a horizontal base. The horizontal base is joined by a side edge flexural pivot to a bottom portion secured to a staff support. A first screw coacts with the middle portion and the front portion to cause the front element to pivot about the side flexural pivot. Another screw coacts between the back portion and middle portion to cause the middle portion together with the front portion to pivot about the upper edge flexural pivot. A third screw coacts between the bottom portion and the horizontal base to cause the horizontal base together with the back, front, and middle portions to pivot about the horizontal edge flexural pivot. Accordingly, it is an object of the present invention to provide an extremely useful optical mount of simplified design.

Another object is to provide an optical mount which may be adjusted to a fine degree along three independent axes.

Other objects and advantages of the present invention will become more apparent from the following detailed description when taken in conjunction with the accompanying drawings.

DESCRIPTION OF THE PREFERRED EMBODIMENT

Figure 1:
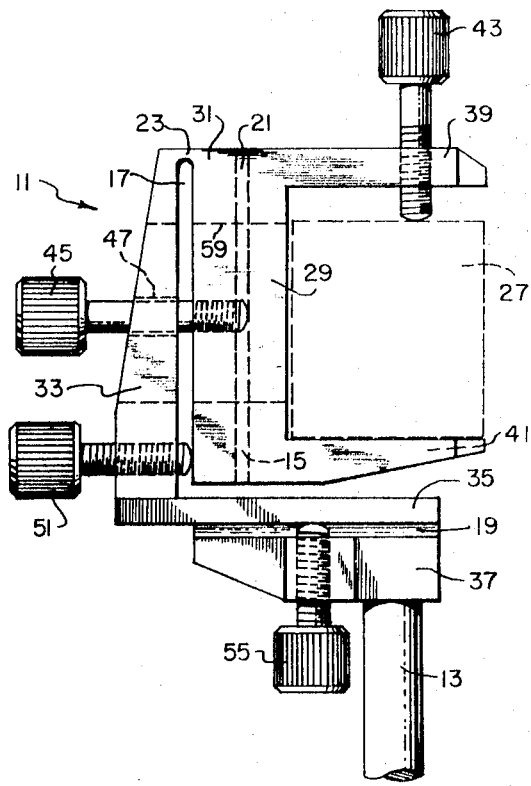
FIG. 1 is a side view of an optical mount according to the present invention.

Referring to the drawings, and in particular to FIG. 1, wherein is illustrated an optical mount 11 of the present invention. The mount 11 is shown secured to a stem 13 of a typical optical bench carrier (not shown). The mount 11 has a plurality of slots 15, 17 and 19 forming flexural pivots 21, 23 and 25 so as to enable an optical device 27 to be adjusted along three independent axes arranged, respectively, in three mutually perpendicular planes.

The mount 11 for purposes of discussion is defined by a front portion 29, a middle portion 31, a back portion 33, a horizontal base portion 35, and a bottom portion 37. The front portion 29 is shown supporting a prism 27 between two cantilevered arms 39 and 41. A screw 43 threaded through the upper cantilevered arm 39 is adjusted tightly against the upper surface of the prism 27 to frictionally hold it in position.

Figure 3:
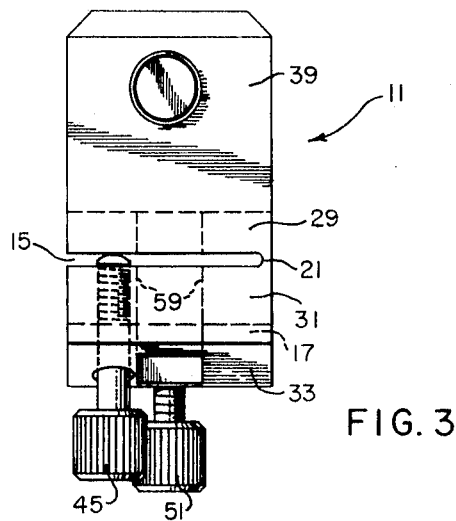
FIG. 3 is a top view of the optical mount of FIG. 1.
Figure 2:
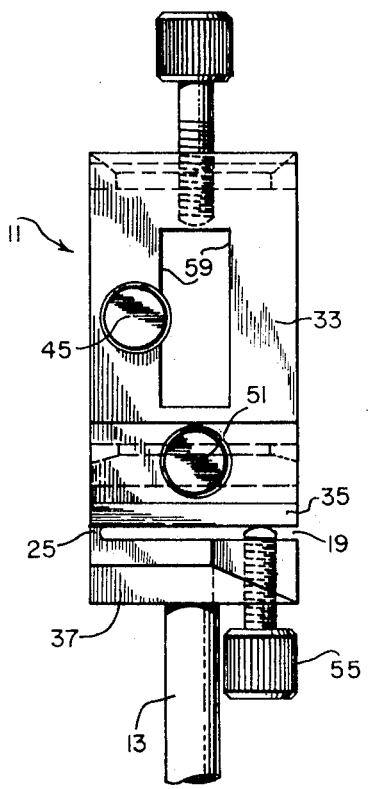
FIG. 2 is a back view of the optical mount of FIG. 1.

The front and middle portions 29 and 31 are joined along the vertical right side by the flexural bridge portion 21 but are otherwise spaced slightly apart so to form the slot 15. The back and middle portions 33 and 31 are also joined by a similar flexural bridge portion 23 along their adjacent upper side or edge and are spaced slightly apart so as to form the second slot 17. An upper screw 45 extends through a clearance hole 47 in the back portion 33 and through a threaded hole in the middle portion 31 so as to contact the back surface of the front portion 29. The hole 47 is sufficiently large as to allow for angular movement of the screw during adjustments. A lower screw 51 extends through a threaded hole in the back portion 33 and contacts the back surface of the middle portion 31. As indicated by FIG. 2, the front, middle, and back portions 29, 31, and 33 have a back or front profile that is rectangular.

It can now be seen that by turning the upper screw 45 inwardly it will push against the back surface of the front portion 29 causing the front portion 29 to pivot to the right against the springlike force of the flexural pivot 21 along the right edge. Also, by then turning the upper screw outwardly, the flexural pivot 21 will cause the front portion 29 to return without any backlash toward its normal position.

The operation of the lower screw 51 is similar in that an inward rotation of the screw will cause it to push against the back surface of the middle portion 31 and force the middle portion 31 together with the connected front portion 29 to pivot upwardly about the upper flexural pivot 23. Also, the turning of the lower screw 51 outwardly will enable the springlike action of the flexural pivot 23 to cause the middle portion 31 together with the connected front portion 29 to return to its normal position, without any backlash.

The upper screw 45 is positioned close to the left side of the mount 11 to achieve the best moment arm about the right flexural pivot 21 and the lower screw 51 is positioned close to the bottom edge of the back portion 33 to achieve the best moment arm about the upper flexural pivot 23.

The mount 11 has the horizontal base portion 35 joined to the lower edge of the back portion 33. The base portion 35 is joined along the left side to the bottom portion 37 by the horizontal flexure bridge portion 25 but both portions are otherwise spaced slightly apart so as to form the third slot 19. A bottom screw 55 extends through a threaded hole within the bottom portion 37 and against the bottom surface of the horizontal base 35. It should now be apparent that by turning the bottom screw 55 inwardly, the horizontal base portion will pivot upwardly about the bottom flexural pivot 25 along its left side carrying with it the back, middle, and front portions 33, 31, 29 respectively. Also, the turning of the bottom screw outwardly will cause the horizontal base portion to return without any backlash toward its normal position by the action of the bottom flexure pivot. The screw 55 is located close to the right side to obtain the best moment arm. Both the horizontal base portion 35 and the bottom portion 37 have a plan profile which is rectangular.

It should be noted that the right side flexural pivot 21 lies in a vertical plane, the upper side flexural pivot 23 lies in a horizontal plane, and the bottom flexural pivot 25 lies in another vertical plane and each plane is perpendicular to the others. Thus, although the flexural pivots are offset from each other they obviously are arranged in a mutually perpendicular manner.

In some applications, it may be desirable to place the mount 11 directly in a light beam path, and for this purpose the back, middle, and front portions 33, 31, 29, respectively, each have a center hole 59 extending therethrough.

It is now apparent that a novel mount has been disclosed with extremely fine adjustment features which is particularly suitable for supporting optical devices such as beam splitters, mirrors, and prisms. While the mount disclosed has only one essential screw for causing a pivotal movement about one particular axis, additional screws could be utilized for additional versatility. Further, while the mount has been described using terms relative to the sides, bottom, and top as presented in tee drawings, it is not necessary to have the mount so positioned in actual practice.

Obviously, many modifications and variations of the present invention are possible in light of the above teachings. It is, therefore, to be understood that within the scope of the appended claims the invention may be practiced other than as specifically claimed.

I claim:

1. A mount suitable for fine adjustment of an optical device along three independent axes, comprising:
   front, middle, and back portions;
   a first flexural bridge portion extending between said front and middle portions along a first side plane so each is spaced a slight distance apart;
   a second flexural bridge portion extending between said middle and back portions along a second side plane perpendicular to said first side plane so said middle and back portions are spaced a slight distance apart;
   a first screw extending through a hole in said back portion and coacting with said middle portion and said front portion so as to cause the front portion to pivot about said first flexural bridge portion, when rotated;
   a second screw coacting with said back element and said middle portion to cause said middle portion together with said front portion to pivot about said second flexural bridge portion, when rotated;
   a base joined to the lower side of said back portion;
   a bottom portion adapted to be secured to a support;
   a third flexural bridge portion joining said base and said bottom portion along a third side plane perpendicular to first and second side planes so said base and bottom portion are spaced a slight distance apart;
   a third screw coacting with said base and bottom portions to cause said base portion to pivot about said third bridge flexural portion together with the back, middle and front portions, when rotated;
   said first side plane is along a vertical side of said front and middle portions;
   said second side plane is along the upper side of said front and middle portions; and
   said third side plane is along the upper side of said base portion.

2. A mount as defined by claim 1 wherein:
   said front, middle, and back portions each have an axial aligned opening substantially at their centers providing a passageway for a light beam.

3. A mount as defined by claim 2 including:
   means on said front portion for supporting an optical device.

4. A mount as defined by claim 3 wherein said means includes two cantilevered arms extending from said front portion.